United States Patent
Terada (10) Patent No.: US 8,639,125 B2
(45) Date of Patent: Jan. 28, 2014

(54) LIGHT RECEPTION DEVICE AND METHOD FOR CONTROLLING THE SAME

(75) Inventor: Koji Terada, Kawasaki (JP)

(73) Assignee: Fujitsu Optical Components Limited, Kawasaki (JP)

(*) Notice: Subject to any disclaimer, the term of this patent is extended or adjusted under 35 U.S.C. 154(b) by 237 days.

(21) Appl. No.: 13/178,991

(22) Filed: Jul. 8, 2011

(65) Prior Publication Data
US 2011/0262149 A1 Oct. 27, 2011

Related U.S. Application Data

(63) Continuation of application No. PCT/JP2009/051656, filed on Jan. 30, 2009.

(51) Int. Cl.
*H04B 10/06* (2011.01)
*H04B 10/12* (2011.01)

(52) U.S. Cl.
USPC .......................... 398/202; 398/149

(58) Field of Classification Search
USPC .................................. 398/208, 149
See application file for complete search history.

(56) References Cited

U.S. PATENT DOCUMENTS

| | | | | |
|---|---|---|---|---|
| 4,859,059 | A * | 8/1989 | Bobb et al. | 356/477 |
| 6,396,605 | B1 * | 5/2002 | Heflinger et al. | 398/140 |
| 7,817,923 | B2 * | 10/2010 | Akiyama et al. | 398/188 |
| 7,848,659 | B2 * | 12/2010 | Miura et al. | 398/188 |
| 2003/0048975 | A1 * | 3/2003 | Lackritz et al. | 385/14 |
| 2005/0047780 | A1 * | 3/2005 | Hoshida et al. | 398/33 |
| 2006/0263098 | A1 * | 11/2006 | Akiyama et al. | 398/188 |
| 2007/0058988 | A1 * | 3/2007 | Yonenaga | 398/186 |
| 2007/0065161 | A1 * | 3/2007 | Miura et al. | 398/186 |
| 2008/0212976 | A1 * | 9/2008 | Asano | 398/161 |
| 2009/0097867 | A1 * | 4/2009 | Yoneyama et al. | 398/212 |
| 2009/0252505 | A1 * | 10/2009 | Terada et al. | 398/208 |
| 2010/0172653 | A1 * | 7/2010 | Yonenaga et al. | 398/154 |

FOREIGN PATENT DOCUMENTS

| | | |
|---|---|---|
| JP | 63-52530 | 3/1988 |
| JP | 2005-80304 | 3/2005 |
| JP | 2007-20138 | 1/2007 |
| JP | 2007-43638 | 2/2007 |
| JP | 2007-181171 | 7/2007 |
| JP | 2008-252545 | 10/2008 |
| WO | WO 2005/088876 | 9/2005 |
| WO | 2007/052380 | 5/2007 |

OTHER PUBLICATIONS

Japanese Office Action issued Oct. 30, 2012 in corresponding Japanese Patent Application No. 2010-548339.
International Search Report mailed Mar. 10, 2009, for International Application No. PCT/JP2009/051656.
English translation of Written Opinion of the International Search Authority PCT/JP2009/05156 dated Feb. 25, 2009.

* cited by examiner

*Primary Examiner* — Ken Vanderpuye
*Assistant Examiner* — Abbas H Alagheband
(74) *Attorney, Agent, or Firm* — Staas & Halsey LLP (57) ABSTRACT

A light reception device includes: an interferometer that outputs a signal obtained by making an optical phase modulated signal interfere with a reference signal after shifting an optical phase of the optical phase modulated signal by a given amount; a light reception element that receives an output signal from the interferometer and converts the output signal into a light reception current; and a phase controller that controls a control amount in controlling the given amount so that a value of a function, which is calculated based on an amount relating to the light reception current and a change amount of an amount relating to the light reception current against the control amount, becomes an extreme value or 0.

9 Claims, 9 Drawing Sheets

LIGHT RECEPTION DEVICE AND METHOD FOR CONTROLLING THE SAME

CROSS-REFERENCE TO RELATED APPLICATION

This application is a continuation application of PCT/JP2009/051656 filed Jan. 30, 2009, the contents of which are herein wholly incorporated by reference.

FIELD

A certain aspect of the embodiments discussed herein is related to a light reception device and a method for controlling the same.

BACKGROUND

Various types of terminals including information home appliances are connected to a network due to the full-scale implementation of the Next Generation Network (NGN) as a communication system. This requires further expansion in the transmission capacity of the network. In the Non-Return-to-Zero (NRZ) modulation method, the transmission capacity is approaching the limit in terms of the usage efficiency of the optical frequency and the like. Thus, a modulation method utilizing an optical phase is under review when upgrading a long distance dense wavelength division modulation (DWDM) transmission system from 10 Gbps to 40 Gbps. The Quadrature Phase Shift Key (QPSK) modulation method and the Differential Quadrature Phase Shift Key (DQPSK) modulation method, which relate 2-bit information to four phases (e.g. 0, $\pi/2$, $\pi$ and $3\pi/2$), achieve high usage efficiency of the optical frequency, and attract the attention as the transmission method for 40 Gbps and 100 Gbps.

When the optical signal is received in the QPSK modulation method or the DQPSK modulation method, the optical phase modulation signal is separated into the I-phase signal and the Q-phase signal. The I-phase signal is delayed by $-\pi/4$, the Q-phase signal is delayed by $\pi/4$, and they are made to interfere with the reference signal. At this time, it is necessary to control the shift amounts of the phase $\pi/4$ and $-\pi/4$ accurately.

Japanese Laid-Open Patent Publication No. 2007-181171 (Document 1) discloses a related art that separates the electrical output signal converted from the optical phase modulated signal and monitors the eye aperture. This makes it possible to control the shift amount of the phase to be $\pi/4$ and $-\pi/4$ by controlling the shift amount of the phase so that the eye aperture becomes the maximum.

Japanese Laid-Open Patent Publication No. 2007-20138 (Document 2) discloses a related art that multiplies an I-phase electrical signal, which is converted from the optical phase modulated signal, before inputted into the data reproducing circuit by a Q-phase electrical signal after outputted from the data reproducing signal, and that controls the shift amount of the phase based on the result of the multiplication.

SUMMARY

According to an aspect of the present invention, there is provided a light reception device including: an interferometer configured to output a signal obtained by making an optical phase modulated signal interfere with a reference signal after shifting an optical phase of the optical phase modulated signal by a given amount; a light reception element configured to receive an output signal from the interferometer and to convert the output signal into a light reception current; and a phase controller configured to control a control amount in controlling the given amount so that a value of a function, which is calculated based on an amount relating to the light reception current and a change amount of an amount relating to the light reception current against the control amount, becomes an extreme value or 0.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

As described previously, methods for controlling the shift amount of the phase accurately are proposed. However, according to related arts disclosed in Documents 1 and 2, as the electrical signal to be output is separated, the amplitude of the output electrical signal decreases. In addition, in Document 1, as the eye aperture of high-speed electrical signal is monitored, expensive high-frequency components are used.

A description will now be given of embodiments of a present invention with reference to drawings.

[First Embodiment]

Figure 1:
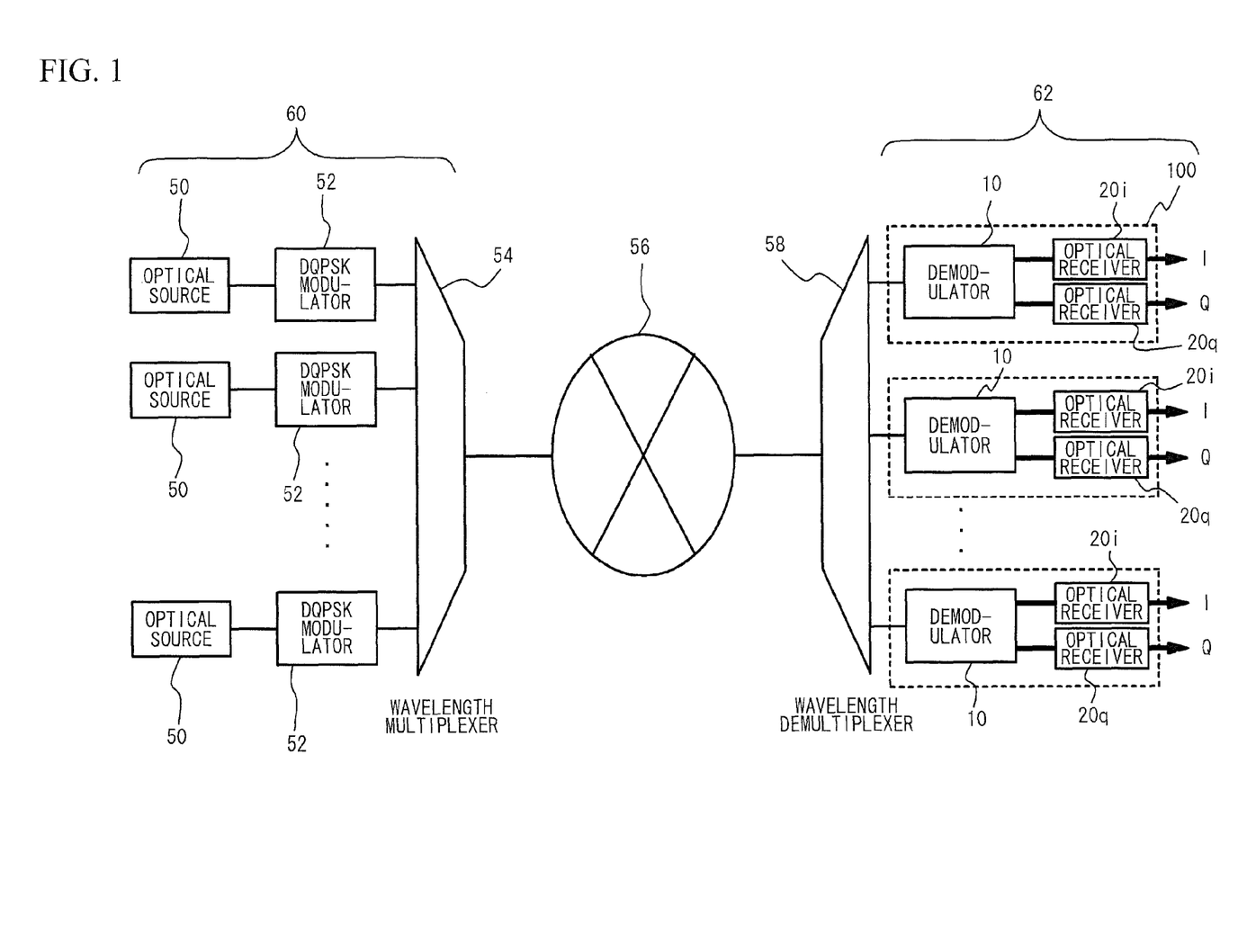
FIG. 1 is a block diagram of a communication system.

A description will now be given of a communication system using the QPSK modulation method or the DQPSK modulation method by using the DQPSK modulation method as an example. FIG. 1 is a block diagram of the communication system using the DQPSK modulation method. The DQPSK modulation method is a method that relates 2-bit information to four optical phases (e.g. 0, $\pi/2$, $\pi$ and $3\pi/2$). The phase is defined based on its one-symbol preceding phase. The communication system using the DQPSK modulation method is provided with an optical source 50, a DQPSK modulator 52 and a wavelength multiplexer 54 on a transmission side 60. It is provided with a wavelength demultiplexer 58, and a light reception device 100 on a reception side 62. The transmission side 60 is coupled with the reception side 62 via a transmission path 56.

A description will be given of the transmission side 60. The optical source 50 converts an electrical signal to an optical intensity modulated signal. Optical intensity modulated signals with different wavelengths are output from optical sources 50. The DQPSK modulator 52 converts the optical intensity modulated signal to an optical phase modulated signal modulated by the DQPSK modulation method. The wavelength multiplexer 54 combines optical phase modulated signals having different wavelengths, and outputs it to one transmission path. The transmission path 56 transmits the combined optical phase modulated signal.

A description will now be given of the reception side 62. The wavelength demultiplexer 58 separates the optical signal input from the transmission path 56 into its constituent wavelengths. Light reception devices 100 convert separated optical phase modulated signals with different wavelengths into I-phase and Q-phase electrical signals. The light reception device 100 is provided with a demodulator 10, and optical receivers 20i and 20q. The demodulator 10 separates the optical phase modulated signal into I-phase and Q-phase optical signals. Optical receivers 20i and 20q convert I-phase and Q-phase optical signals into electrical signals respectively. A detail of the light reception device 100 will be described later.

The QPSK modulation method is a method that relates 2-bit infoil lation to four optical phases (e.g. 0, π/2, π and 3π/2) in the same manner as the DQPSK modulation method. The phase is defined based on a reference signal. In a communication system using the QPSK modulation method, a QPSK modulator is used instead of the DQPSK modulator 52 in FIG. 1, and a 90-degree hybrid is used instead of the demodulator 10. Other configurations are same as those in FIG. 1, and the description will be omitted.

Figure 2:
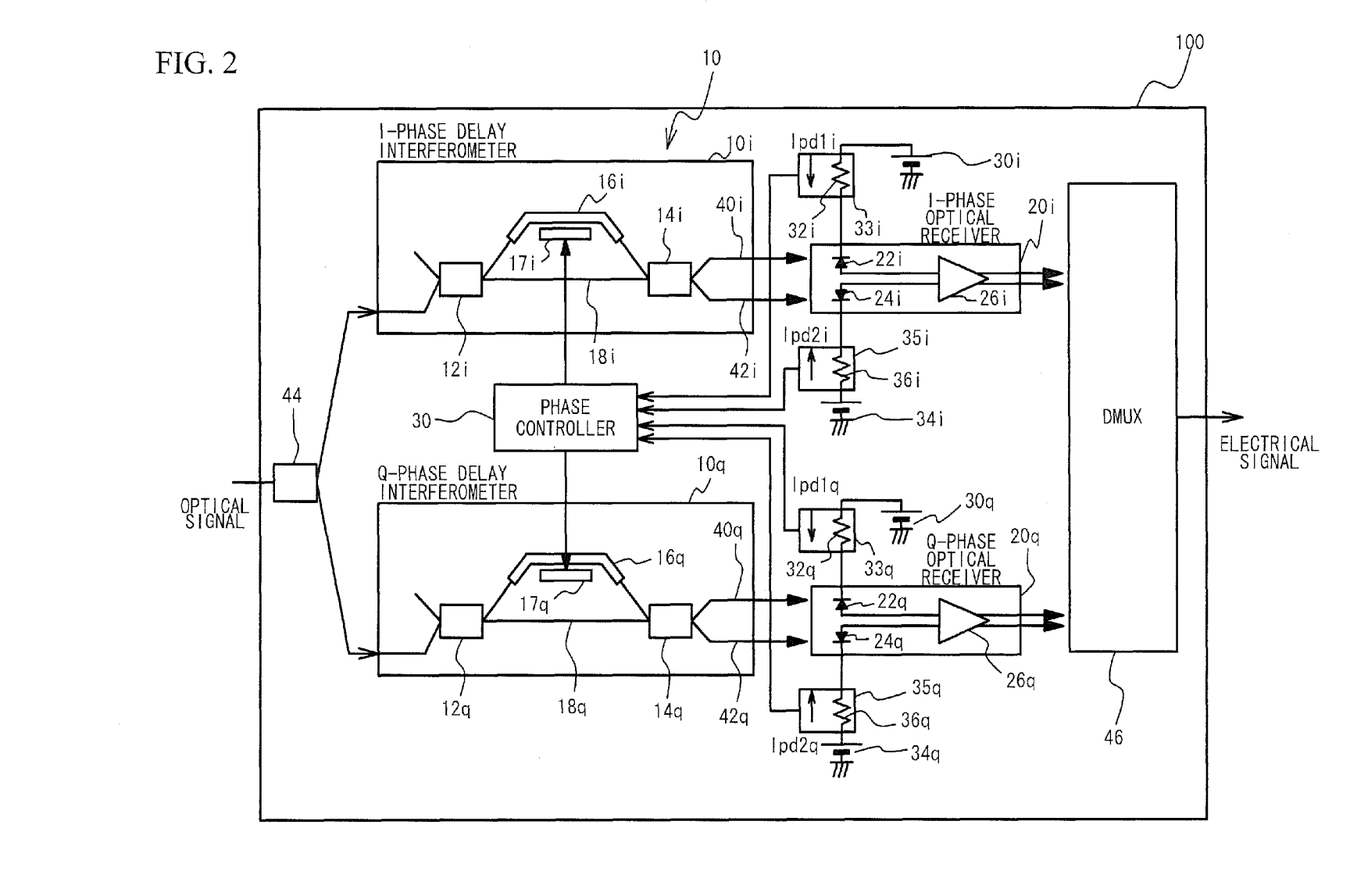
FIG. 2 is a block diagram of a light reception device in accordance with a first embodiment.

FIG. 2 is a block diagram of the light reception device in accordance with the first embodiment that demodulates a signal modulated by the DQPSK modulation method. The light reception device 100 is provided with a demodulator 10, an I-phase optical receiver 20i, a Q-phase optical receiver 20q, and a DMUX 46 mainly. The demodulator 10 is provided with an optical branching filter 44, an I-phase delay interferometer 10i (I-phase interferometer) and a Q-phase delay interferometer 10q (Q-phase interferometer). The optical branching filter 44 separates the optical phase modulated signal into two optical modulated signals.

The I-phase delay interferometer 10i and the Q-phase delay interferometer 10q are Mach-Zehnder interferometers for example. The I-phase delay interferometer 10i is provided with couplers 12i and 14i, a delay path 16i, a heater 17i, and a transmission path 18i. The coupler 12i separates the optical phase modulated signal separated by the optical branching filter 44. The delay path 16i delays the phase of the optical signal by one-symbol −π/4. The transmission path 18i does not delay the optical signal. The coupler 14i makes the optical signal of the delay path 16i interfere with the optical signal of the transmission path 18i, and outputs optical intensity modulated signals of a positive-phase signal 40i and a negative-phase signal 42i. The positive-phase signal 40i and the negative-phase signal 42i are complementary signals of each other. As described above, the I-phase delay interferometer 10i outputs the positive-phase signal 40i and the negative-phase signal 42i which are a pair of signals complementing each other. As described, the I-phase delay interferometer 10i shifts the phase of the I-phase signal of the optical phase modulated signal by a first given amount (one-symbol −π/4), and makes it interfere with the reference signal. Then, it outputs a pair of I-phase signals complementing each other (the positive-phase signal 40i and the negative-phase signal 42i).

The Q-phase delay interferometer 10q is provided with couplers 12q and 14q, a delay path 16q, a heater 17q and a transmission path 18q. The delay path 16q delays the phase of the optical signal by one-symbol +π/4. The coupler 14q makes the optical signal of the delay path 16q interfere with the optical signal of the transmission path 18q, and outputs optical intensity modulated signals of a positive-phase signal 40q and a negative-phase signal 42q. Other configurations and operations are same as those of the I-phase delay interferometer 10i, and a description will be omitted. As described above, the Q-phase delay interferometer 10q shifts the phase of the Q-phase signal of the optical phase modulated signal by a second given amount (one-symbol +π/4), and makes it interfere with the reference signal. Then, it outputs a pair of Q-phase signals complementing each other (the positive-phase signal 40q and the negative-phase signal 42q).

The I-phase optical receiver 20i is provided with photodiodes 22i and 24i (a pair of I-phase light reception elements) and a differential amplifier 26i. Anode sides of photodiodes 22i and 24i are coupled to the differential amplifier 26i. Cathode sides of photodiodes 22i and 24i are coupled to DC power sources 30i and 34i via resistors 32i and 36i respectively. Photodiodes 22i and 24i convert the positive-phase signal 40i and the negative-phase signal 42i into current signals respectively. That is to say, photodiodes 22i and 24i receive the positive-phase signal 40i and the negative-phase signal 42i, which are a pair of I-phase signals, respectively, and convert them into a pair of I-phase light reception currents (currents Ipd1i and Ipd2i). The differential amplifier 26i differentially amplifies the positive-phase side current signal and the negative-phase side current signal, and outputs electrical signals. Current detection units 33i and 35i detect currents Ipd1i and Ipd2i by monitoring voltages of the both sides of resistors 32i and 36i on the power source side of photodiodes 22i and 24i respectively.

The Q-phase optical receiver 20q is provided with photodiodes 22q and 24q (a pair of Q-phase light reception elements) and a differential amplifier 26q. Cathode sides of photodiodes 22q and 24q are coupled to DC power sources 30q and 34q via resistors 32q and 36q. Current detection units 33q and 35q detect currents Ipd1q and Ipd2q by monitoring voltages of the both sides of resistors 32q and 36q on the power source side of photodiodes 22q and 24q respectively. That is to say, photodiodes 22q and 24q receive the positive-phase signal 40q and the negative-phase signal 42q, which are a pair of Q-phase signals, respectively, and convert them into a pair of Q-phase light reception currents (currents Ipd1q and Ipd2q). Other configurations and operations are same as those of the I-phase optical receiver 20i, and a description will be omitted.

The DMUX 46 reproduces data from outputs of the I-phase optical receiver 20i and the Q-phase optical receiver 20q. A phase controller 30 controls delay paths 16i and 16q so that the delay amounts of delay paths 16i and 16q become one-symbol −π/4 and one-symbol +π/4 respectively.

Figure 3:
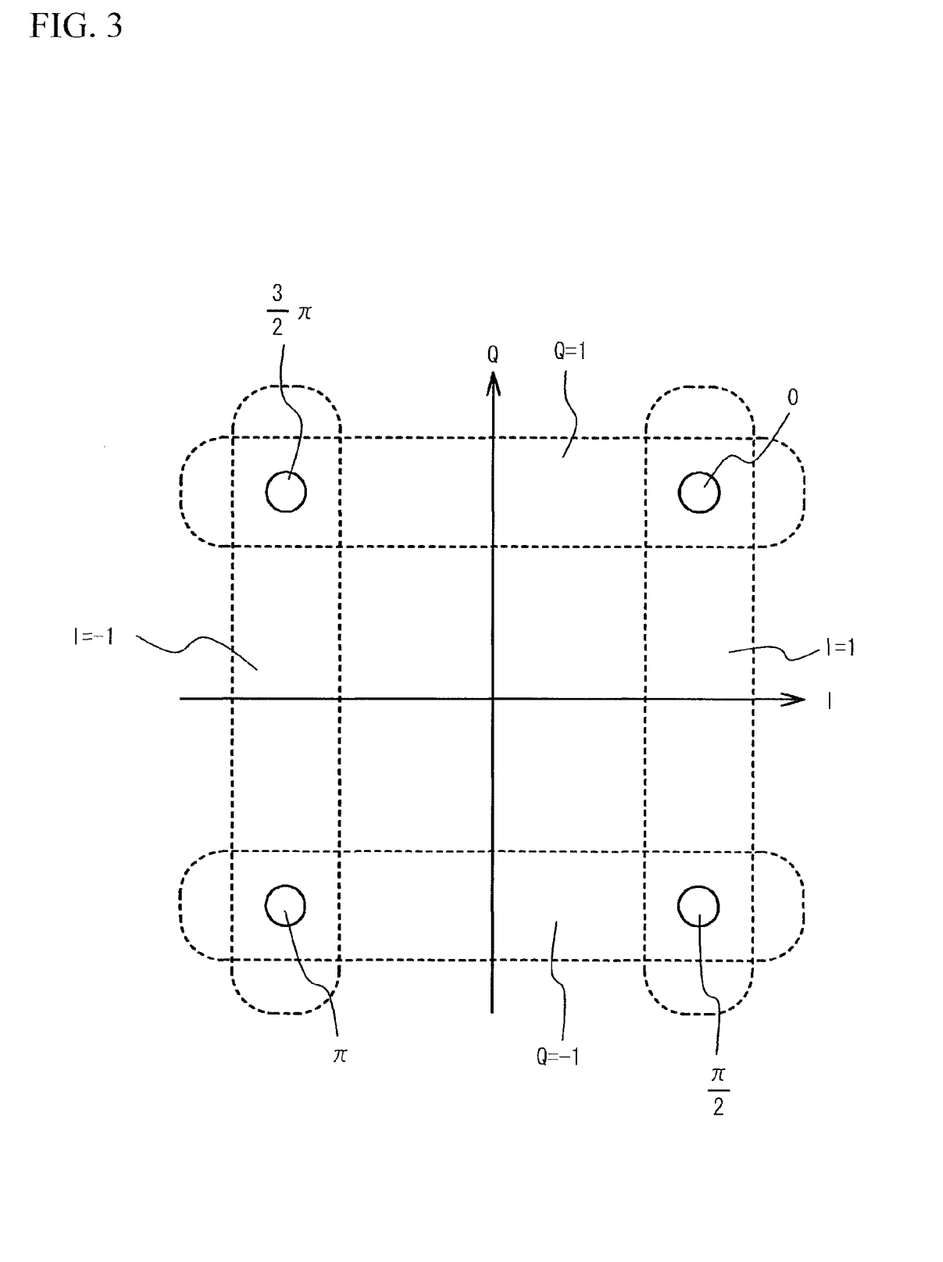
FIG. 3 is a constellation diagram of DQPSK.

FIG. 3 is a constellation diagram of the DQPSK modulation method. When I is equal to 1 (I=1) and Q is equal to 1 (Q=1), the phase shift is 0. When I is equal to 1 (I=1) and Q is equal to 1 (Q=1), the phase shift is π/2. When I is equal to −1 (I=−1) and Q is equal to −1 (Q=−1), the phase shift is π. When I is equal to −1 (I=−1) and Q is equal to 1 (Q=1), the phase shift is 3π/2. In the I-phase delay interferometer 10i, the delay path 16i delays the optical phase modulated signal by one-symbol −π/4. The coupler 14i makes the optical signal of the delay path 16i interfere with the optical signal of the transmission path 18i. Thus, when the phase shift is 0 or 3π/2, the amplitude of the positive-phase signal 40i becomes large and the amplitude of the negative-phase signal 42i becomes small. On the other hand, when the phase shift is π/2 or π, the amplitude of the positive-phase signal 40i becomes small and the amplitude of the negative-phase signal 42i becomes large.

The I-phase optical receiver 20i outputs the electrical signal of which the phase shift corresponds to 0 or $3\pi/2$, or $\pi/2$ or $\pi$.

In the Q-phase delay interferometer 10q, the delay path 16q delays the optical phase modulated signal by one-symbol +4/$\pi$. Therefore, when the phase shift is 0 or $\pi/2$, the amplitude of the positive-phase signal 40q becomes large and the amplitude of the negative-phase signal 42q becomes small. On the other hand, when the phase shift is $\pi$ or $3\pi/2$, the amplitude of the positive-phase signal 40q becomes small and the amplitude of the negative-phase signal 42q becomes large. The Q-phase optical receiver 20q outputs the electrical signal of which the phase shift corresponds to, for example, 0 or $\pi/2$, or $\pi$ or $3\pi/2$. The DMUX 46 demodulates the 2-bit signal from outputs of the I-phase optical receiver 20i and the Q-phase optical receiver 20q.

In the light reception device 100, it is desired that the delay amounts of delay paths 16i and 16q are controlled to be $-\pi/4$ and $+\pi/4$ respectively. The control of delay amounts of delay paths 16i and 16q is carried out by temperatures of delay paths 16i and 16q for example. This is because the delay amounts of the phase vary according to temperatures of delay paths 16i and 16q. Thus, the delay amounts can be controlled by providing heaters 17i and 17q in the vicinity of delay paths 16i and 16q for example and controlling calorific values of heaters 17i and 17q (power input to heaters).

Figure 4:
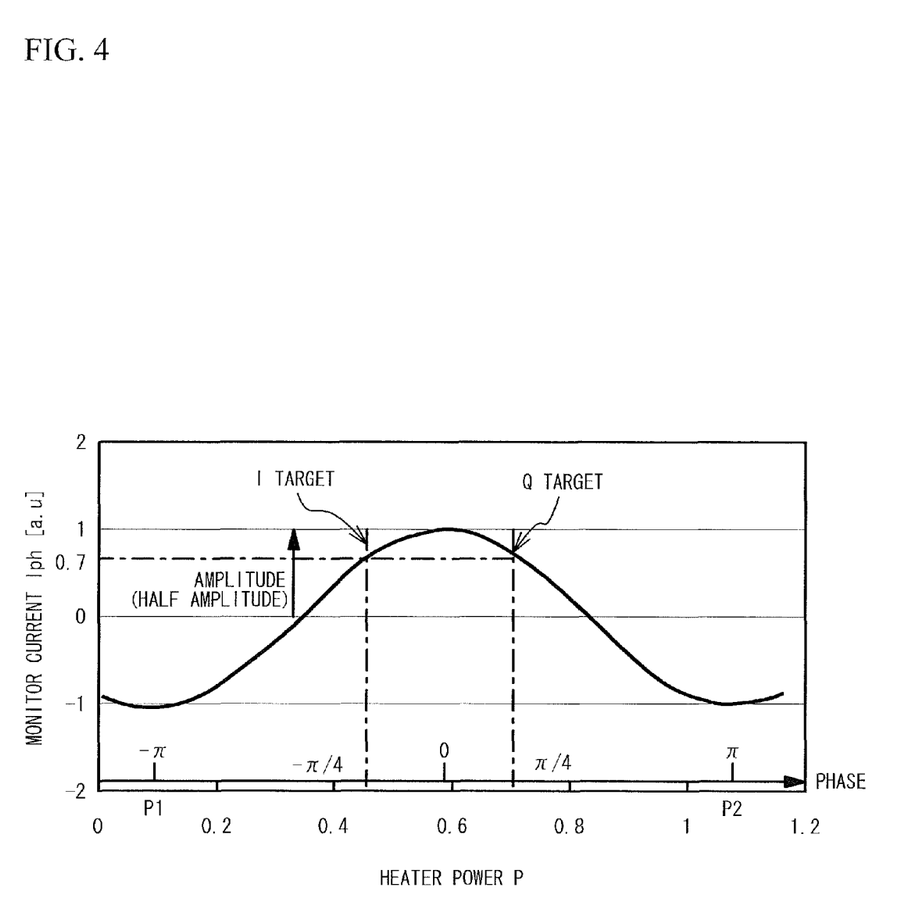
FIG. 4 is a diagram illustrating a monitor current against a heater power.

FIG. 4 is a diagram illustrating a monitor current Iph against a heater power P. The relationship between the heater power and the delay amount of the phase is almost linear relationship. The relationship between the heater power and the phase becomes the relationship illustrated with the horizontal axis of FIG. 4. Regardless of the I-phase and the Q-phase, as Iph behaves same against the delay amount of the phase, a description will be given by describing Ipd1i and Ipd1q as Ipd1 and describing Ipd2i and Ipd2q as Ipd2. The monitor current Iph is calculated by the formula Iph=Ipd1–Ipd2. When the delay amount of the phase becomes 0, Iph becomes a local maximum. When the delay amount of the phase becomes $\pi$ or $-\pi$, Iph becomes a local minimum. In FIG. 4, Idh is normalized so that the maximum value of Iph becomes 1, and the minimum value of Iph becomes –1. It is preferable that the phase controller 30 controls a heater power, and controls the delay amount to be $-\pi/4$ or $\pi/4$. However, the phase controller controls the heater power P so that the control target value of Ipd becomes the maximum value of Idp×0.7. As described, it is very difficult to control Iph to become the value other than an extreme value or 0.

Figure 5:
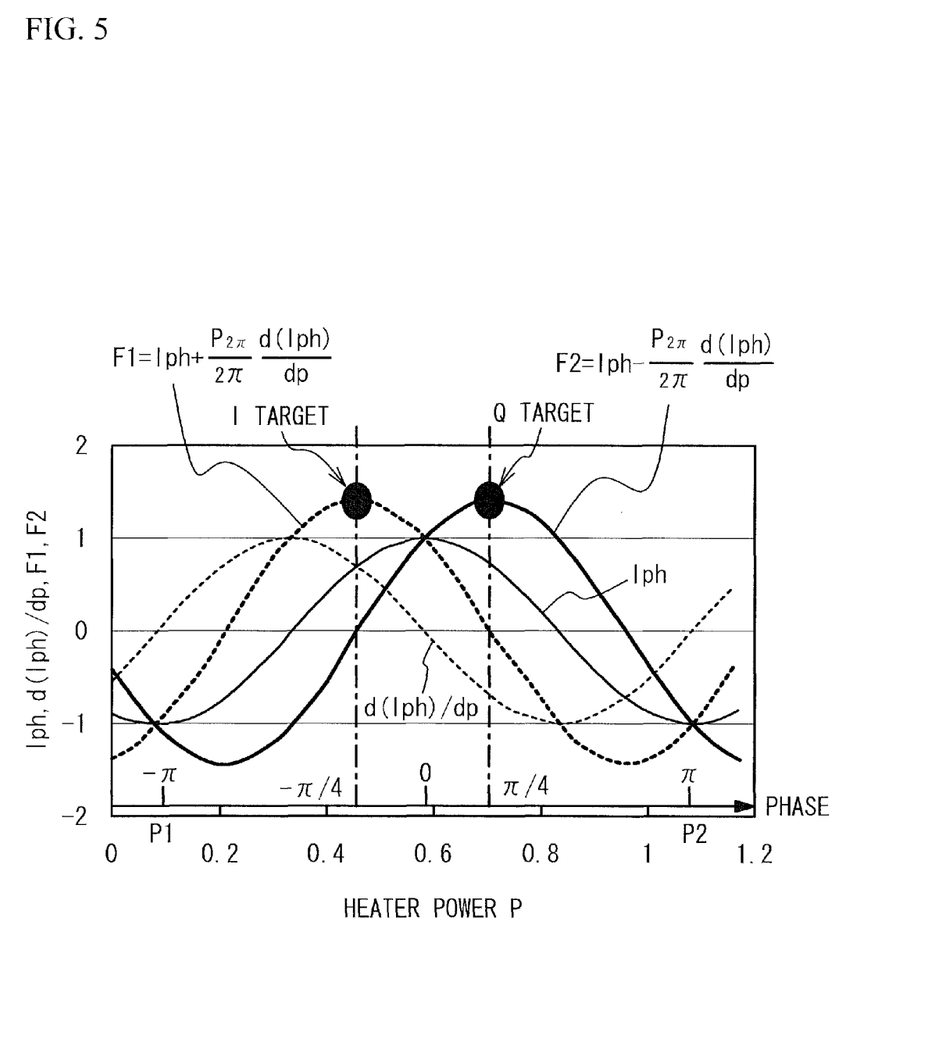
FIG. 5 is a diagram illustrating Iph, d(Iph)/dP, F1 and F2 against a heater power.

Hereinafter, a description will be given of a control method of the phase controller 30 in accordance with the first embodiment. FIG. 5 illustrates a heater power, a monitor current Iph against the delay amount of the phase, and other functions. The monitor current Iph is calculated from the formula Iph=Ipd1–Ipd2 in the same manner as FIG. 4, and is also calculated from the following formula $$Iph = Iph0 \cdot \cos(2\pi \cdot P/P_{2\pi})$$

Here, Iph0 represents the amplitude of Iph (half amplitude). In FIG. 5, Iph0 is equal to 1 (Iph0=1). $P_{2\pi}$ represents the difference of heater power P corresponding to a period of amplitude fluctuation of Iph. In FIG. 5, $P_{2\pi}$ is equal to P2–P1. In FIG. 5, the monitor current Iph is illustrated with a solid line.

A differential d(Iph)/dP of Iph against the heater power P is expressed with a following formula, and illustrated with a dashed line in FIG. 5.

$$d(Iph)/dP = 2\pi Iph0/P_{2\pi} \cdot [-\sin(2\pi P/P_{2\pi})]$$

Here, monitor functions F1 and F2 are defined as follows.

$$F1 = Iph + (P_{2\pi}/2\pi) \cdot d(Idh)/dP = \sqrt{2} Iph0 \cdot \cos(2\pi \cdot P/P_{2\pi} - \pi/4)$$

$$F2 = Iph - (P_{2\pi}/2\pi) \cdot d(Idh)/dP = \sqrt{2} Iph0 \cdot \cos(2\pi \cdot P/P_{2\pi} + \pi/4)$$

Monitor functions F1 and F2 are illustrated with a bold dashed line and a bold solid line in FIG. 5 respectively.

As described with above formulas and illustrated in FIG. 5, the monitor function F1 takes a local maximum value when the delay amount of the phase is $-\pi/4$. The monitor function F2 takes a local maximum value when the delay amount of the phase is $\pi/4$. Thus, the change $\delta$Iph of Iph when the heater power P is changed by $\delta$P is measured, and monitor functions F1 and F2 are expressed with following formulas.

$$F1 = Iph + (P_{2\pi}/(2\pi \cdot \delta P)) \cdot \delta(Idh)$$

$$F2 = Iph - (P_{2\pi}/(2\pi \cdot \delta P)) \cdot \delta(Idh)$$

In regard to the I-phase, if the phase controller 30 controls the heater power P so that the value of the monitor function F1 becomes the local maximum value, the delay amount of the phase can be controlled to be $-\pi/4$. In regard to the Q-phase, if the phase controller 30 controls the heater power P so that the value of the monitor function F2 becomes the local maximum value, the delay amount of the phase can be controlled to be $\pi/4$.

A description will now be given of a process of the phase controller 30.

Figure 6:
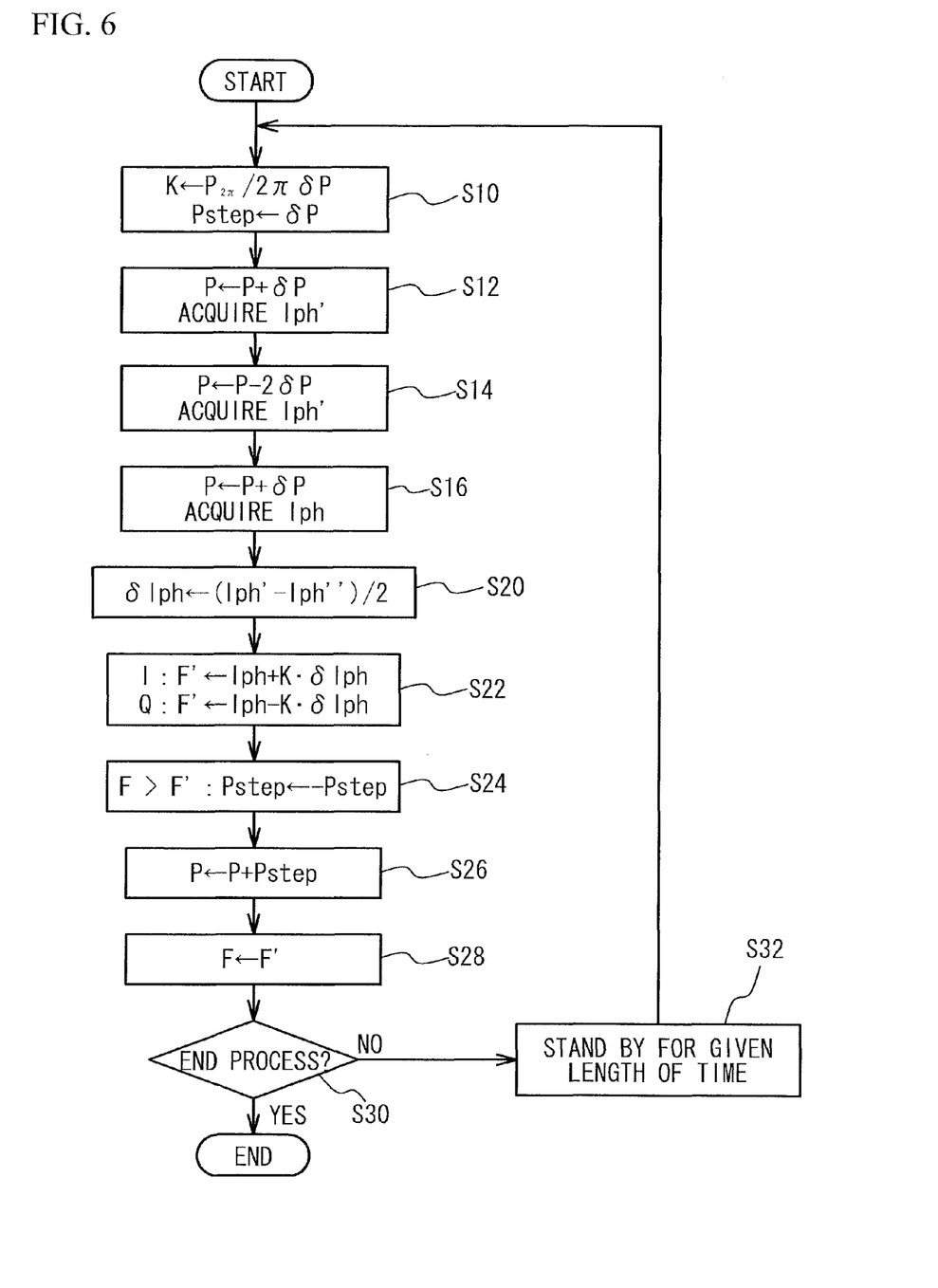
FIG. 6 is a flowchart illustrating a process of a phase controller in accordance with the first embodiment.
Figure 7:
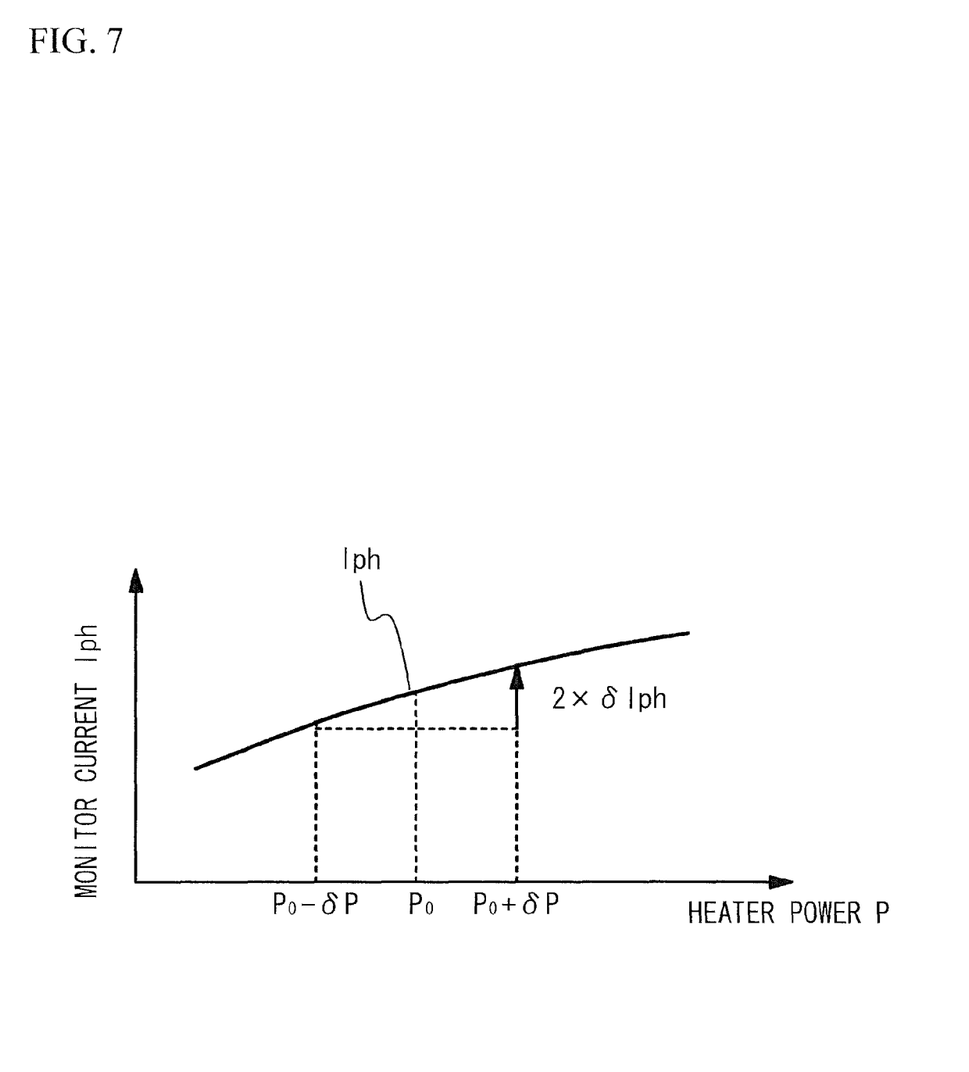
FIG. 7 is a diagram illustrating a monitor current against a heater power.

FIG. 6 is a flowchart illustrating a process executed by the phase controller 30. The phase controller 30 executes the control of the I-phase delay interferometer 10i and the Q-phase delay interferometer 10q by different loops, but the process will be described collectively by using FIG. 6. FIG. 7 illustrates a monitor current Iph against the heater power P. Assume that the heater power P when Iph is measured is Po. The difference $P_{2\pi}$ of heater power corresponding to a period of amplitude fluctuation of Iph is preliminarily measured. The change amount $\delta$P by which the heater power P is changed when the difference is calculated is preliminarily determined.

Referring to FIG. 6, the phase controller 30 assigns $P_{2\pi}/(2\pi \cdot \delta P)$ to a coefficient K, and assigns $\delta$P to Pstep (step S10). The phase controller 30 assigns P+$\delta$P to the heater power P, and acquires Iph' (step S12). According to this, in FIG. 7, the monitor current Iph' when the heater power P is Po+$\delta$P is acquired. The phase controller 30 assigns P–2$\delta$P to the heater power P, and acquires Iph" (step S14). According to this, in FIG. 7, the monitor current Iph" when the heater power P is Po–$\delta$P is acquired. The phase controller 30 assigns P+$\delta$P to the heater power P, and acquires Iph (step S16). According to this, in FIG. 7, the monitor current Iph when the heater power P is Po is acquired. The phase controller 30 assigns (Iph'–Iph")/2 to $\delta$Iph (step S20). According to this, Iph and Mph when the heater power is Po are measured.

Referring to FIG. 6, the phase controller 30 assigns Iph+K·$\delta$Iph to F' when controlling the I-phase, and assigns Iph–K·$\delta$Iph to F' when controlling the Q-phase (step S22). According to this, the monitor function F' when the heater power is Po is calculated. When F is greater than F', the phase controller 30 assigns –Pstep to Pstep (step S24). F represents the monitor function which was calculated previous time. The phase controller 30 assigns P+Pstep to P (step S26). The phase controller 30 assigns F' to F (step S28). The phase controller 30 determines whether to end the process (step S30). When the determination is YES, the process is ended. When the determination is NO, the phase controller 30 stands by for a given length of time (step S32), and returns to the step S10.

The phase controller 30 inverts Pstep by steps S24 and S26 when the monitor function F' is smaller than the value of the previous time. That is to say, the phase controller 30 controls the next heater power P so that the value of the monitor function F' becomes larger. According to this, the phase controller 30 can control the heater power P so that the value of the monitor function F' becomes the local maximum value.

Figure 8:
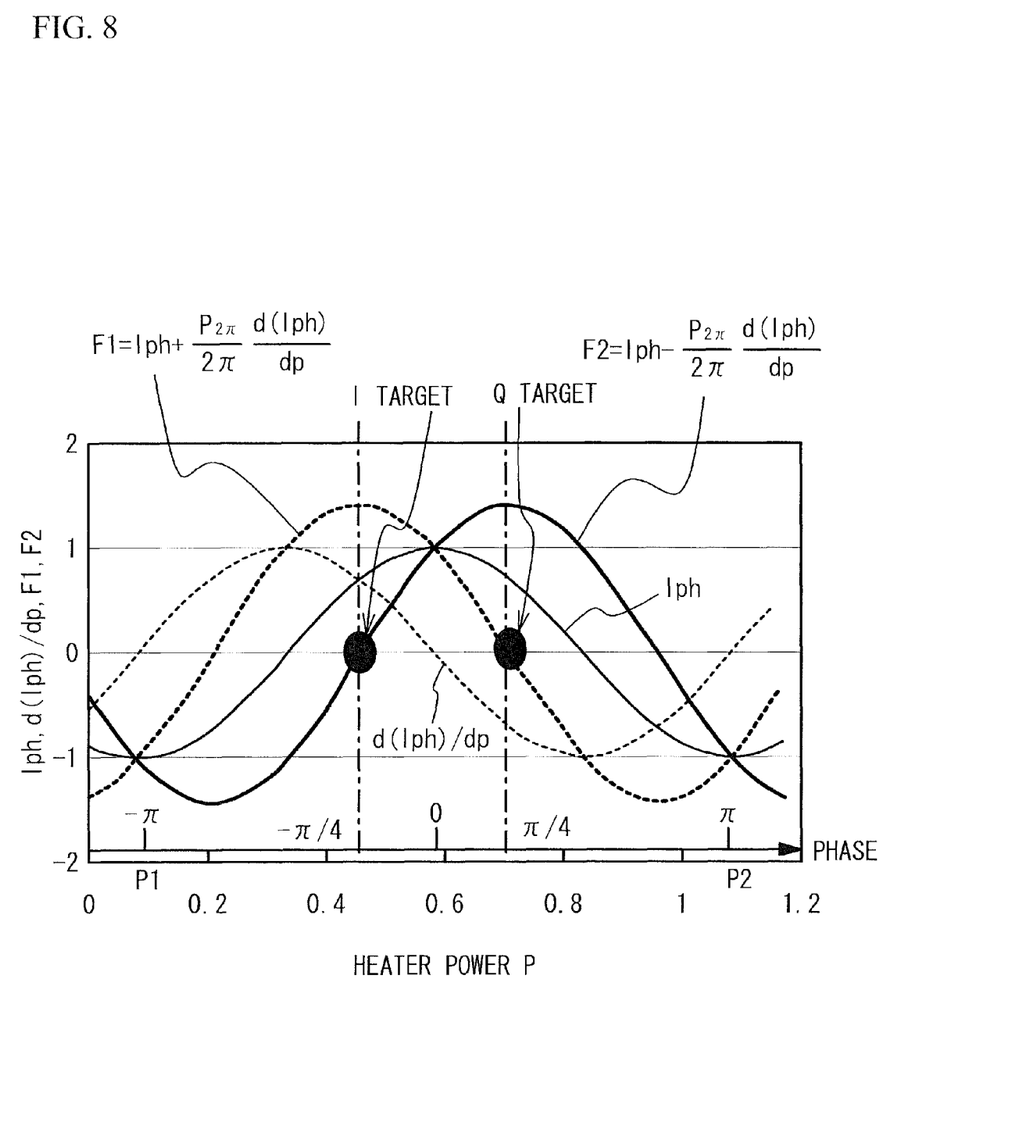
FIG. 8 is a diagram illustrating Iph, d(Iph)/dP, F1 and F2 against a heater power.

A description will now be given of another example where the phase controller 30 controls the heater power P. As illustrated in FIG. 8, the value of the monitor function F1 becomes 0 when the delay amount of the phase is $\pi/4$. In addition, the value of the monitor function F2 becomes 0 when the delay amount of the phase is $-\pi/4$. Therefore, in regard to the I-phase, if the phase controller 30 controls the heater power so that the value of the monitor function F2 becomes 0, the delay amount of the phase can be controlled to be $-\pi/4$. In regard to the Q-phase, if the phase controller 30 controls the heater power P so that the value of the monitor function F1 becomes 0, the delay amount of the phase can be controlled to be $\pi/4$.

According to the first embodiment, the phase controller 30 controls the control amount so that the value of the function (e.g. monitor functions F1 and F2), which is calculated based on the amount relating to light reception currents Ipd1$i$, Ipd2$i$, Ipd1$q$ and Ipd2$q$ (e.g. the monitor current Iph) and the change amount (e.g. d(Iph)/dP) of the amount relating to the light reception current against the control amount in controlling the delay amount (e.g. the heater power P), becomes the extreme value or 0. As described above, the phase controller 30 controls delay amounts of delay interferometers 10$i$ and 10$q$ by using light reception currents flowing through light reception elements (photodiodes 22$i$, 24$i$, 22$q$ and 24$q$). According to this, it becomes possible to ensure the large amplitude compared to the light reception device disclosed in Documents 1 and 2 which separates the electrical signal to be output. Especially, the separation of the high bit-rate electrical signal is not easy. For example, if the electrical signal is separated at a branching ratio of 1:1 at which the separation is easy, the amplitude of the electrical signal becomes 50 percent of its original amplitude. Even though the electrical signal is separated at a branching ratio of 10:1, the amplitude of the electrical signal becomes 91 percent of its original amplitude. In contrast, according to the first embodiment, it is possible to ensure almost 100 percent of the amplitude of the electrical signal.

Moreover, according to the first embodiment, as the control amount is controlled by the light reception current with low frequency, it is possible to control the control amount by simple and inexpensive configuration compared to controlling the control amount by using the high-frequency signal as disclosed in Documents 1 and 2. Further, the control amount (heater power) is controlled so that the value of the function such as monitor functions F1 and F2 becomes the extreme value or 0. According to this, it is possible to control the control amount easily.

The amount relating to the light reception current may be a light reception current of one photodiode for example. However, preferably, the amount relating to the light reception current is the difference Iph between light reception currents Ipd1$i$ and Ipd2$i$ (or, Ipd1$q$ and Ipd2$q$) of photodiodes 22$i$ and 24$i$ (or 22$q$ and 24$q$: a pair of light reception elements), as described in the first embodiment. According to this, the phase controller 30 is able to control the delay amount based on the signal of which the amplitude is larger.

Furthermore, as illustrated in FIG. 5 and FIG. 8, the phase controller 30 controls the control amount P so that the value of the monitor function F1=Iph+A·$\delta$Iph/$\delta$P or the monitor function F2=Iph−A·$\delta$Iph/$\delta$P becomes the extreme value or 0. Here, $\delta$Iph/$\delta$P represents the change amount of Iph against the control amount P, and the coefficient A is a coefficient to make the maximum amplitude of Iph equal to the maximum amplitude of $\delta$Iph/$\delta$P. According to this, the delay amounts can be controlled to be $-\pi/4$ and $\pi/4$.

In addition, according to the first embodiment, the phase controller 30 controls the control amount Pi in controlling the delay amount of the I-phase delay interferometer 10$i$, which means the first given amount by which the phase of the I-phase signal is shifted, so that the value of the monitor function F1=Iphi+Ai·$\delta$Iphi/$\delta$Pi becomes the extreme value. In addition, the phase controller 30 controls the control amount Pq in controlling the delay amount of the Q-phase delay interferometer, which means the second given amount by which the phase of the Q-phase signal is shifted, so that the value of the monitor function F2=Iphq−Aq·$\delta$Iphq/$\delta$Pq becomes the extreme value. Here, Iphi represents the difference between Ipd1$i$ and Ipd2$i$ which are a pair of I-phase light reception currents of a pair of I-phase light reception elements (photodiodes 22$i$ and 24$i$). Iphq represents the difference between Ipd1$q$ and Ipd2$q$ which are a pair of Q-phase light reception currents of a pair of Q-phase light reception elements (photodiodes 22$q$ and 24$q$). $\delta$Iphi/$\delta$Pi represents the change amount of Iphi against Pi, and $\delta$Iphq/$\delta$Pq represents the change amount of Iphq against Pq. Ai is a coefficient to make the maximum amplitude of Iphi equal to the maximum amplitude of $\delta$Iphi/$\delta$Pi, and Aq is a coefficient to make the maximum amplitude of Iphq equal to the maximum amplitude of $\delta$Iphq/$\delta$Pq. According to this, as illustrated in FIG. 5, it is possible to control the delay amounts of I-phase and Q-phase delay interferometers to be target values $-\pi/4$ and $\pi/4$ accurately.

Furthermore, according to the first embodiment, the phase controller 30 controls Pi so that the value of the monitor function F2=Iphi−Ai·$\delta$Iphi/$\delta$Pi becomes 0. In addition, the phase controller 30 controls Pq so that the value of the monitor function F1=Iphq+Aq·$\delta$Iphq/$\delta$Pq becomes 0. According to this, as illustrated in FIG. 8, it is possible to control the delay amounts of I-phase and Q-phase delay interferometers to be target values $-\pi/4$ and $\pi/4$ accurately.

According to the first embodiment, the optical phase modulated signal itself is used as the reference signal, and in the I-phase the first given amount by which the phase is shifted is one-symbol $-\pi/4$, and in the Q-phase the second given amount by which the phase is shifted is one-symbol $+\pi/4$. According to this, it is possible to demodulate the optical phase modulated signal modulated by the DQPSK modulation method.

In the first embodiment, a description was given with an example using a heater power P as a control amount in controlling the delay amount which is a given amount by which the phase of the signal is shifted, but the control amount is not limited to the embodiment, and may be the physical amount which is able to control the delay amount. It is preferable that the relationship between the delay amount and the control amount is a linear relationship.

[Second Embodiment]

Figure 9:
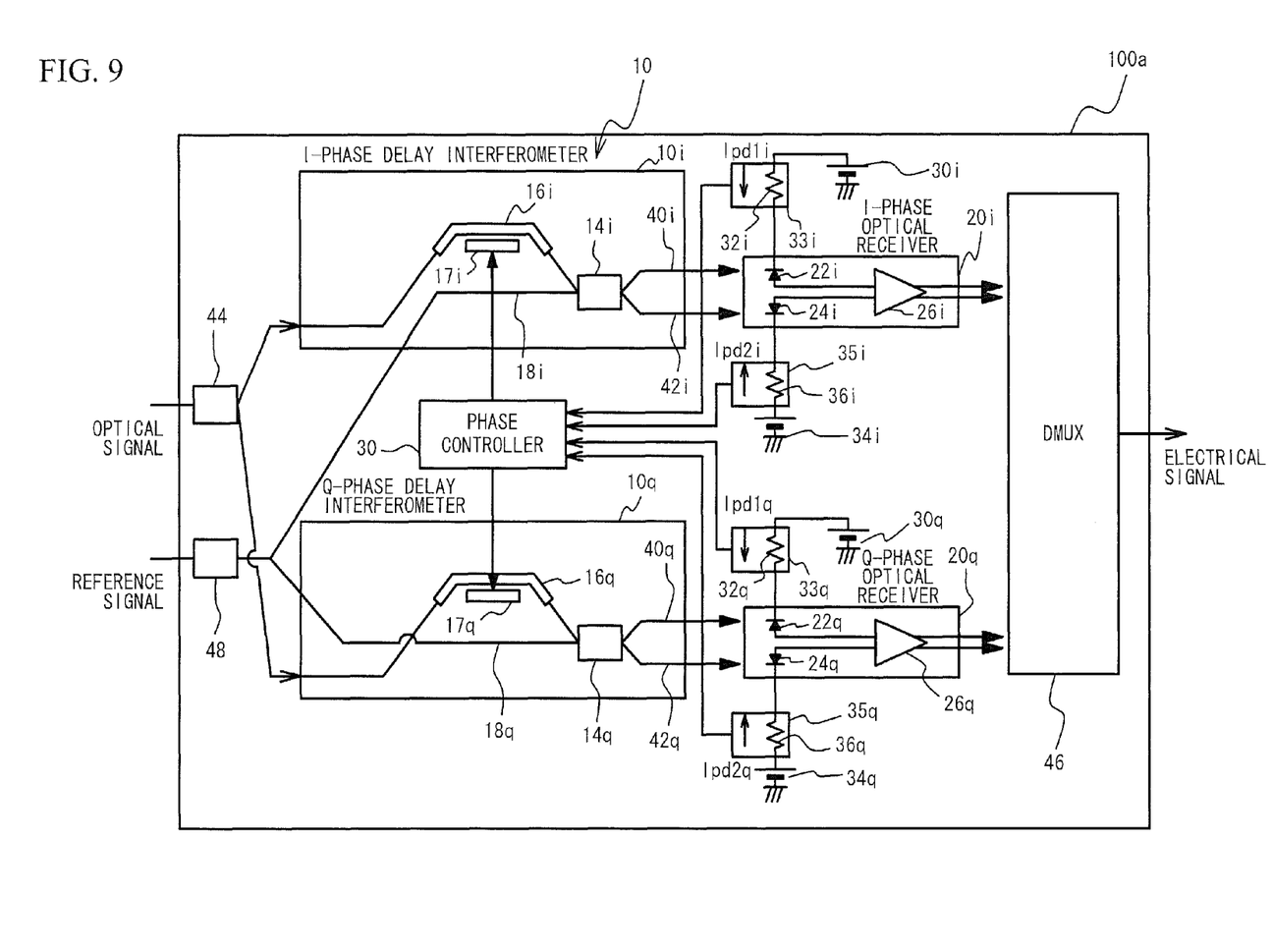
FIG. 9 is a block diagram of a light reception device in accordance with a second embodiment.

In a second embodiment, an example of a light reception device that demodulates a signal modulated by the QPSK modulation method is described. FIG. 9 is a block diagram of the light reception device in accordance with the second embodiment. Referring to FIG. 9, a light reception device 100$a$ is provided with an optical branching filter 48 that separates the reference signal outputted from an optical local oscillator or the like. In the I-phase delay interferometers 10$i$ and the Q-phase delay interferometers 10$q$, optical phase modulated signals separated by the optical branching filter 44 are input into delay paths 16$i$ and 16$q$ respectively. Couplers 14$i$ and 14$q$ make signals delayed by delay paths 16$i$ and 16$q$ interfere with reference signals separated by the optical branching filter 48. Other configurations are same as those illustrated in FIG. 2 of the first embodiment, and the description will be omitted. The operation of the phase controller 30 is same as the first embodiment.

According to the second embodiment, in the delay path 16$i$ the first given amount by which the phase of the I-phase signal is shifted is set to $-\pi/4$, and in the delay path 16$q$ the second given amount by which the phase of the Q-phase signal is shifted is set to $+\pi/4$. Output signals from delay paths 16$i$ and 16$q$ are made to interfere with reference signals. According to this, it is possible to demodulate the optical phase modulated signal modulated by the QPSK modulation method. As described above, the control described in FIG. 5 and FIG. 8 can be applied to the light reception device 100$a$ for the QPSK modulation method.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

What is claimed is:

1. A light reception device, comprising:
an interferometer configured to output a pair of signals complementing each other obtained by making an optical phase modulated signal interfere with a reference signal after shifting an optical phase of the optical phase modulated signal by a given amount;
a pair of light reception elements configured to respectively receive the pair of signals from the interferometer and to respectively convert the pair of signals into a pair of light reception currents; and
a phase controller configured to control a control amount so that Iph+A·δIph/δP) or Iph−A·δIph/δP becomes an extreme value or 0, when the Iph represents the difference of the pair of light reception currents of the pair of light reception elements, the δIph/δP represents a change amount of the Iph against the control amount, and the A represents a coefficient to make a maximum amplitude of the Iph equal to a maximum amplitude of the δIph/δP.

2. The light reception device according to claim 1, wherein the interferometer includes an I-phase interferometer and a Q-phase interferometer that correspond to an I-phase signal and a Q-phase signal of the optical phase modulated signal respectively; and
each of the pair of light reception elements includes an I-phase light reception element and a Q-phase light reception element that correspond to an I-phase signal and a Q-phase signal of the optical phase modulated signal respectively.

3. A light reception device comprising:
an I-phase interferometer configured to output a pair of I-phase signals complementing each other by making an I-phase signal of an optical phase modulated signal interfere with a reference signal after shifting an optical phase of the I-phase signal by a first given amount;
a Q-phase interferometer configured to output a pair of Q-phase signals complementing each other by making a Q-phase signal of the optical phase modulated signal interfere with the reference signal after shifting an optical phase of the Q-phase signal by a second given amount;
a pair of I-phase light reception elements configured to receive the pair of I-phase signals and convert the pair of I-phase signals into a pair of I-phase light reception currents;
a pair of Q-phase light reception elements configured to receive the pair of Q-phase signals and convert the pair of Q-phase signals into a pair of Q-phase light reception currents; and
a phase controller configured to control Pi so that Iphi+Ai·δIphi/δPi becomes an extreme value, and to control Pq so that Iphq−Aq·δIphq/δPq becomes an extreme value, when the Iphi represents a difference of the pair of I-phase light reception currents, the Iphq represents a difference of the pair of Q-phase light reception currents, the Pi represents a control amount in controlling the first given amount, the Pq represents a control amount in controlling the second given value, the δIphi/δPi represents a change amount of the Iphi against the Pi, the δIphq/δPq represents a change amount of the Iphq against the Pq, Ai represents a coefficient to make a maximum amplitude of the Iphi equal to a maximum amplitude of the δIphi/δPi, and Aq represents a coefficient to make a maximum amplitude of the Iphq equal to a maximum amplitude of the δIphq/δPq.

4. A light reception device comprising:
an I-phase interferometer configured to output a pair of I-phase signals complementing each other by making an I-phase signal of an optical phase modulated signal interfere with a reference signal after shifting an optical phase of the I-phase signal by a first given amount;
a Q-phase interferometer configured to output a pair of Q-phase signals complementing each other by making a Q-phase signal of the optical phase modulated signal interfere with the reference signal after shifting an optical phase of the Q-phase signal is by a second given amount;
a pair of I-phase light reception elements configured to receive the pair of I-phase signals and convert the pair of I-phase signals into a pair of I-phase light reception currents;
a pair of Q-phase light reception elements configured to receive the pair of Q-phase signals and convert the pair of Q-phase signals into a pair of Q-phase light reception currents; and
a phase controller configured to control Pi so that Iphi−Ai·δIphi/δPi becomes 0, and to control Pq so that Iphq+Aq·δIphq/δPq becomes 0, when the Iphi represents a difference of the pair of I-phase light reception currents, the Iphq represents a difference of the pair of Q-phase light reception currents, Pi represents a control amount in controlling the first given amount, the Pq represents a control amount in controlling the second given value, the δIphi/δPi represents a change amount of the Iphi against the Pi, the δIphq/δPq represents a change amount of the Iphq against the Pq, Ai represents a coefficient to make a maximum amplitude of the Iphi equal to a maximum amplitude of the δIphi/δPi, and Aq represents a coefficient to make a maximum amplitude of the Iphq equal to a maximum amplitude of the δIphq/δPq.

5. The light reception device according to claim 3, wherein
the optical phase modulated signal is a signal modulated by the DQPSK modulation method;
the reference signal is the optical phase modulated signal;
the first given amount is one-symbol −n/4; and
the second given amount is one-symbol +n/4.

6. The light reception device according to claim 4, wherein
the optical phase modulated signal is a signal modulated by the DQPSK modulation method;
the reference signal is the optical phase modulated signal;
the first given amount is one-symbol −n/4; and
the second given amount is one-symbol +n/4.

7. The light reception device according to claim 3, wherein
the optical phase modulated signal is a signal modulated by the QPSK modulation method;
the first given amount is −n/4; and
the second given amount is +n/4.

8. The light reception device according to claim 4, wherein
the optical phase modulated signal is a signal modulated by the QPSK modulation method;
the first given amount is −n/4; and
the second given amount is +n/4.

9. A method for controlling a light reception device that includes an interferometer that outputs a pair of signals complementing each other obtained by making an optical phase modulated signal interfere with a reference signal after shifting an optical phase of the optical phase modulated signal by a given amount, and a pair of light reception elements that respectively receive the pair of signals from the interferometer and respectively convert the output signal into a pair of light reception currents, the method comprising:

controlling a control amount so that $Iph+A\cdot\delta Iph/\delta P$ or $Iph-A\cdot\delta Iph/\delta P$ becomes an extreme value or 0, when the Iph represents the difference of the pair of light reception currents of the pair of light reception elements, the $\delta Iph/\delta P$ represents a change amount of the Iph against the control amount, and the A represents a coefficient to make a maximum amplitude of the Iph equal to a maximum amplitude of the $\delta Iph/\delta P$.

* * * * *

UNITED STATES PATENT AND TRADEMARK OFFICE
CERTIFICATE OF CORRECTION

PATENT NO. : 8,639,125 B2  Page 1 of 1
APPLICATION NO. : 13/178991
DATED : January 28, 2014
INVENTOR(S) : Terada It is certified that error appears in the above-identified patent and that said Letters Patent is hereby corrected as shown below:

In the Claims:

In Column 9, Line 44, In Claim 1, delete "Iph+A·δIph/δP)" and insert -- Iph+A·δIph/δP --, therefor.
In Column 11, Line 5, In Claim 5, delete "-n/4;" and insert -- -Π/4; --, therefor.
In Column 11, Line 6, In Claim 5, delete "+n/4." and insert -- +Π/4. --, therefor.
In Column 11, Line 11, In Claim 6, delete "-n/4;" and insert -- -Π/4; --, therefor.
In Column 11, Line 12, In Claim 6, delete "+n/4." and insert -- +Π/4. --, therefor.
In Column 11, Line 16, In Claim 7, delete "-n/4;" and insert -- -Π/4; --, therefor.
In Column 11, Line 17, In Claim 7, delete "+n/4." and insert -- +Π/4. --, therefor.
In Column 12, Line 1, In Claim 8, delete "-n/4;" and insert -- -Π/4; --, therefor.
In Column 12, Line 2, In Claim 8, delete "+n/4." and insert -- +Π/4. --, therefor.

Signed and Sealed this
Twenty-ninth Day of April, 2014

Michelle K. Lee
*Deputy Director of the United States Patent and Trademark Office*